Jan. 31, 1956 W. P. LUTHER 2,733,396
SPEED CONTROL OF SERIES MOTOR FOR COMMINUTING MACHINE
Filed Aug. 30, 1954 4 Sheets-Sheet 1

Inventor
William P. Luther
By [signature]
Attorney

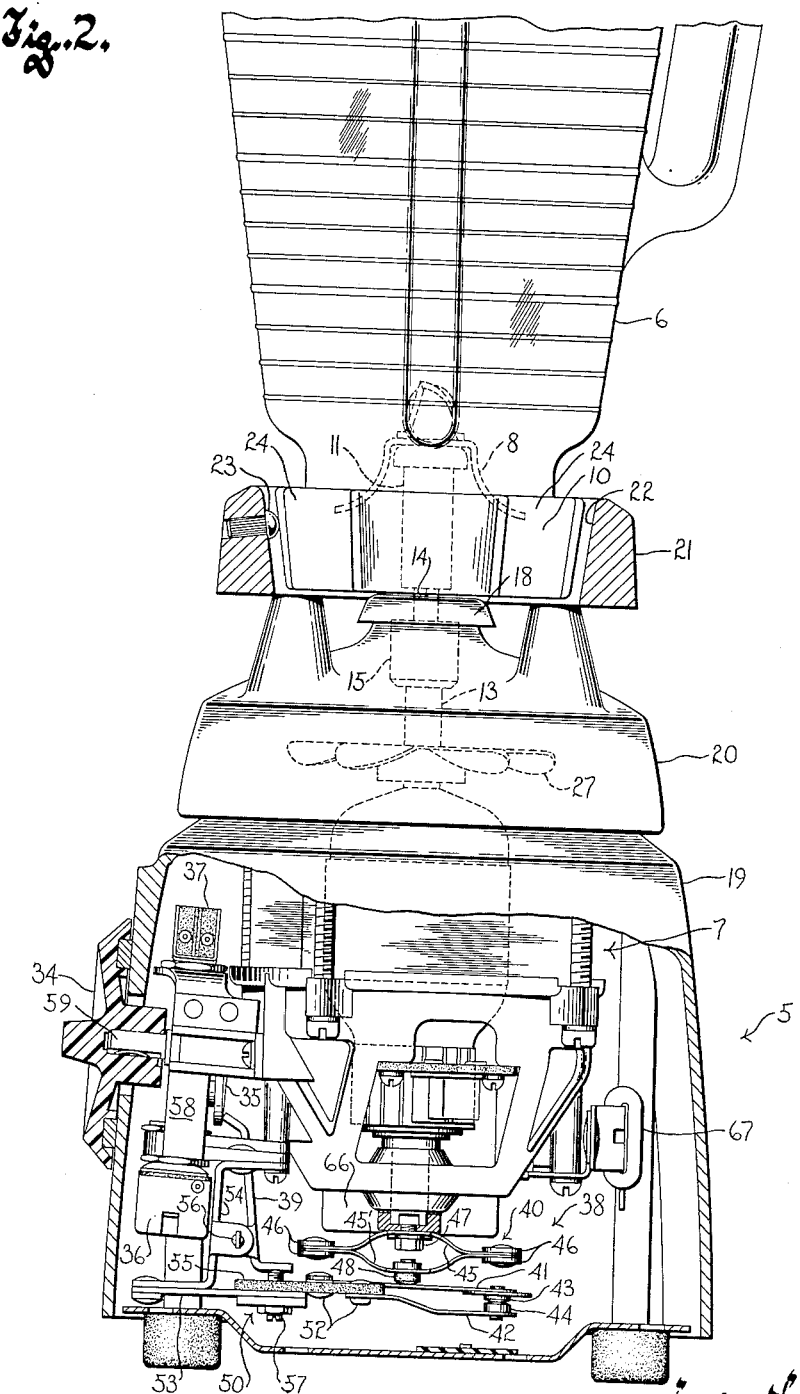

Jan. 31, 1956
W. P. LUTHER
2,733,396
SPEED CONTROL OF SERIES MOTOR FOR COMMINUTING MACHINE
Filed Aug. 30, 1954
4 Sheets-Sheet 3
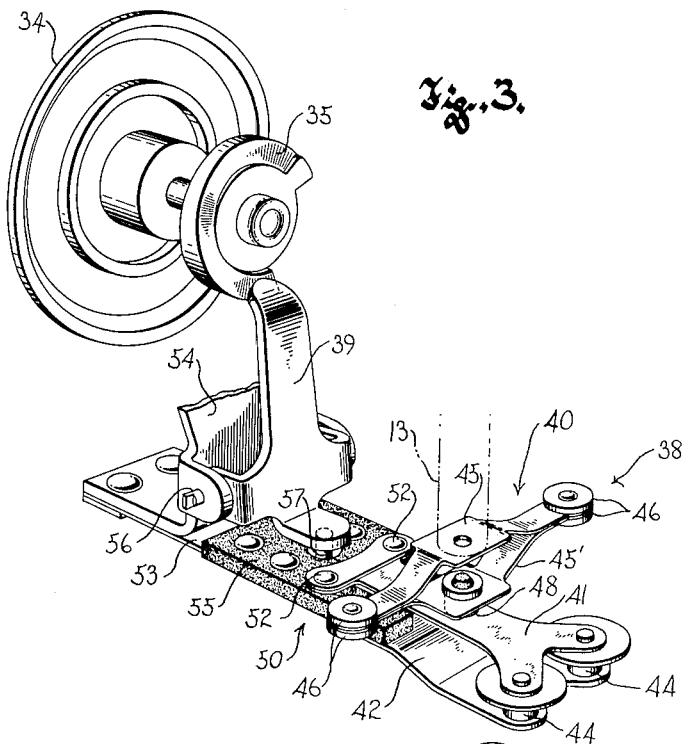
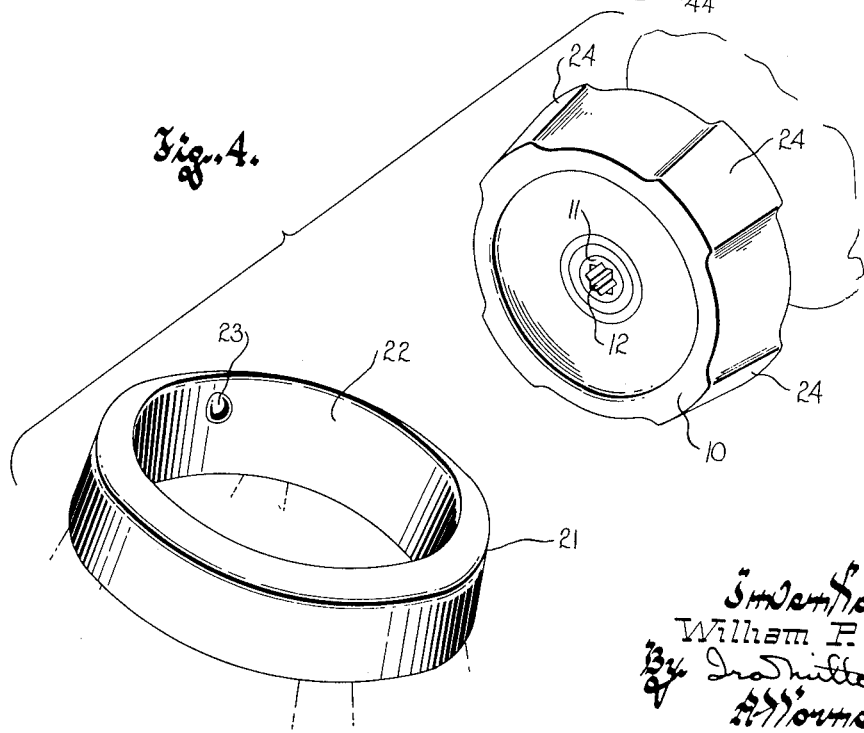
Inventor
William P. Luther
By Ira Milton Jones
Attorney Jan. 31, 1956  W. P. LUTHER  2,733,396
SPEED CONTROL OF SERIES MOTOR FOR COMMINUTING MACHINE
Filed Aug. 30, 1954  4 Sheets-Sheet 4

Inventor
William P. Luther
By Ira Milton Jones
Attorney

United States Patent Office 2,733,396
Patented Jan. 31, 1956

2,733,396

SPEED CONTROL OF SERIES MOTOR FOR COMMINUTING MACHINE

William P. Luther, Racine, Wis., assignor to John Oster Manufacturing Company, Milwaukee, Wis., a corporation of Wisconsin Application August 30, 1954, Serial No. 452,929

6 Claims. (Cl. 318—251)

This invention relates to food comminuting and blending machines and refers more particularly to means for regulating the speed of rotor rotation in such machines.

As is well-known, food comminuting and blending machines comprise a base in which an electric motor is housed, a mixing vessel having a rotor therein and which is readily removably mounted on the base, and a readily separable splined driving connection between the upper end of the motor shaft and the rotor in the mixing vessel.

Since such machines may be used for comminuting, mixing and blending materials of a wide range of consistencies, including liquids and juices, solid vegetables such as celery and carrots, and even dry solids such as coffee, a series-wound motor is normally employed to power the machine in order to provide sufficient rotor torque for all of the various types of work which the machine may be called upon to perform.

For maximum versatility it is desirable that a food comminuting and blending machine be controllable to provide a wide range of rotor speeds to enable selection of the particular speed best suited for each of the several types of work to be performed by the machine. Heretofore the only satisfactory expedient for providing for operation of a series-wound motor at different speeds with good speed regulation and substantially constant torque at each selected speed has been the employment of a centrifugally responsive switch to effect de-energization of the motor windings when the motor rotated faster than a predetermined speed. While such a centrifugally operated switch may be made adjustable so that it will open at any of a number of predetermined speeds, this control expedient is unsatisfactory for food comminuting machines in that it cannot provide a sufficiently wide range of speed adjustments for all of the operations which may be performed by such a machine, and particularly for satisfactory low-speed operation of the machine.

Because the opening of the centrifugal switch determines the maximum motor speed for any given switch adjustment, the switch is required to interrupt the highest currents when it is adjusted for the minimum speed to which it will control the motor. In other words, the motor draws the highest current at low speeds, and especially when it is heavily loaded, and consequently a centrifugal switch cannot be satisfactorily used to control the motor at very low speeds since it would then be called upon to interrupt harmfully large currents with the result that arcing would occur at the switch contacts and the switch would have a tendency to burn out in a short time.

It is essential, however, that a food comminuting and blending machine be adjustable to provide for low-speed operation of the motor, and moreover at such low speeds the motor should exert a relatively small torque. Unless provision is made for low-torque operation of the motor as a concomitant of its low-speed operation, the very high normal starting torque of a series-wound motor would cause the rotor driven thereby to accelerate so rapidly upon initial energization of the motor that portions of the material in the mixing vessel would be thrown upwardly and out of the vessel. This is particularly true when liquids are being mixed or whipped in the vessel.

Thus for satisfactory operation of a machine of the character described it is essential that the minimum speed adjustment of the motor control provide not only a low speed to accommodate certain types of mixing or whipping operations, but also a low motor torque to thereby assure slow acceleration of the rotor during starting of the motor. In this respect, also, a centrifugally responsive switch is deficient.

While there are other expedients than a centrifugal switch for controlling the speed of a series-wound motor, as for example the employment of a rheostat in series with the motor windings or the use of taps for short-circuiting portions of the field winding, these devices do not provide satisfactory speed or torque regulation of the motor and are especially unsuitable because they result in wide variations in motor torque throughout its speed range.

It is therefore a general object of this invention to provide in a food comminuting and blending machine of the character described means for obtaining the desired control of the speed and torque of the motor of the machine.

More specifically, it is an object of this invention to provide a food comminuting and blending machine of the character described having speed regulating means providing for operation of the motor at a minimum speed at which the motor exerts a low torque, and also for operation at any selected speed throughout a wide range of speeds above said minimum speed, and throughout which the motor exerts a high torque.

Another and very important object of this invention is to provide speed control means for a series-wound electric motor comprising a centrifugally responsive switch for providing a wide range of speed control settings above a desired minimum motor speed, and an alternative circuit arrangement not incorporating the centrifugal switch and providing for energization of the motor windings with lower current for minimum motor speed and for low-torque starting of the motor.

A further object of this invention resides in the provision of a novel centrifugally operated switch for regulating the speed of a series-wound motor together with novel adjustment means for said switch, all of which may be readily mounted in the base of a food comminuting and blending machine, alongside the motor.

Still another object of this invention resides in the provision of a centrifugally operated switch of the character described which will respond to variations in the shaft speed of the motor but will be unaffected by extraneous vibrations, thereby insuring that the switch will accurately maintain any predetermined motor speed for which it is adjusted.

With the above and other objects in view, which will appear as the description proceeds, this invention resides in the novel construction, combination and arrangement of parts substantially as hereinafter described and more particularly defined by the appended claims, it being understood that such changes in the precise embodiment of the hereindisclosed invention may be made as come within the scope of the claims.

The accompanying drawings illustrate one complete example of the physical embodiment of the invention constructed according to the best mode so far devised for the practical application of the principles thereof, and in which:

Figure 2 is a side elevational view of the food comminuting and blending machine, as seen from the right of Figure 1, a portion of the base being broken away;

Figure 3 is a perspective view of the centrifugally actuated switch of this invention and the adjustment means for the same;

Figure 4 is a fragmentary perspective view of the top of the base of the machine of this invention and the bottom of the mixing vessel therefor;

Figure 1:
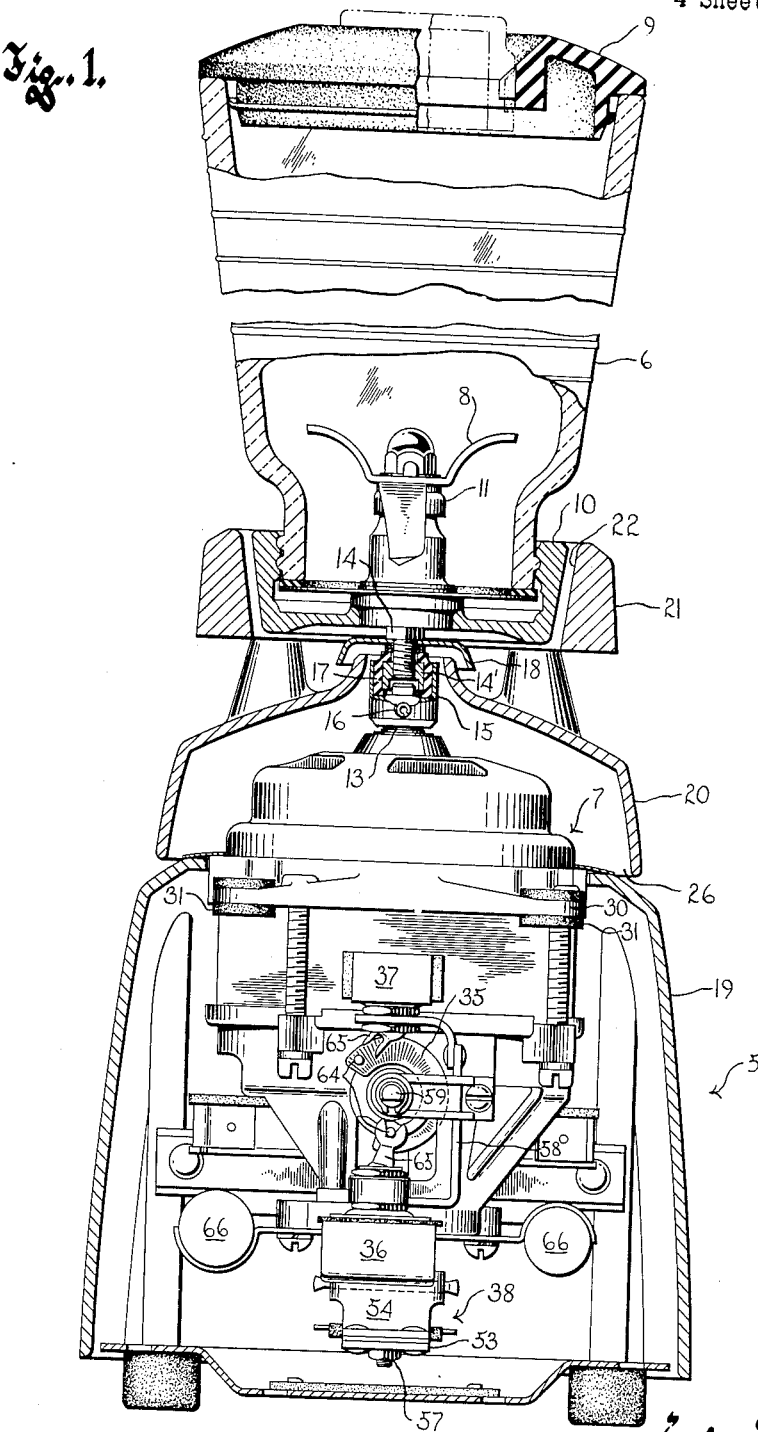
Figure 1 is a vertical sectional view of a food comminuting and blending machine embodying the principles of this invention.
Figure 5:
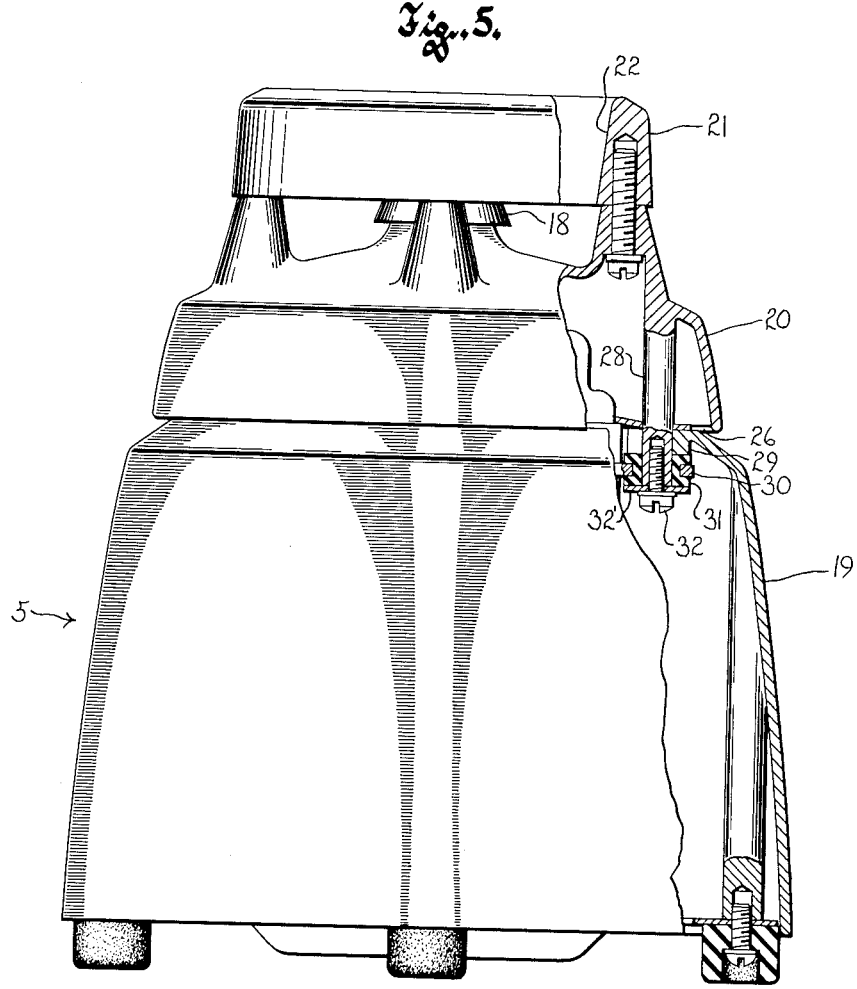
Figure 5 is a side elevational view of the base, a portion being shown cut away.

Referring now more particularly to the accompanying drawing, in which like numerals designate like parts throughout the several views, the numeral 5 designates generally the base of a food comminuting and blending machine, upon which a mixing vessel 6 is mounted and which houses a series-wound motor 7 whereby a rotor or agitator 8 in the mixing vessel is driven.

The mixing vessel is of a well-known type comprising a substantially tubular glass jar which may be fitted at its top with a suitable readily removable closure 9, in this instance shown as the closure described and claimed in the copending application of William P. Luther, Serial No. 442,277, filed July 9, 1954; and the jar is closed at its bottom by means of a cover 10 with which it has a screw-threaded connection.

A rotor shaft 11 journaled in the cover has the rotor secured to its upper end and has a non-circular well 12 (see Figure 4) opening to its bottom to provide the female element of a readily separable splined connection between the rotor shaft and the shaft 13 of the motor. The male element of the splined connection comprises a stud 14 projecting upwardly from a coupling 15 on the motor shaft and receivable in the well in the rotor shaft. To compensate for any misalignment between the motor and rotor shafts, a limited degree of universal swiveling motion is afforded the stud 14, by reason of the fact that the coupling is secured to the motor shaft by means of a transverse pin 16 which fits tightly in the shaft but extends into loosely fitting holes in the coupling. In addition, the stud is threaded into a hub 14' which is bonded to the hub by means of a resilient cushion 17 of neoprene, rubber or the like, which further facilitates such universal motion and also makes for quiet operation of the machine as well as cooperating in electrically insulating the motor from the housing.

A disk-like slinger 18 carried by the stud covers the opening in the top of the housing through which the stud projects and prevents liquid from entering the housing.

The housing comprises a lower body member 19, an upper body member 20 and an annular collar 21 secured to the top of the upper body member. The bore 22 of the collar tapers downwardly to supportingly receive the correspondingly tapered cover 10 of the mixing vessel, and a protrusion 23, provided by the rounded head of a pin projecting into the bore of the collar, cooperates with one of a plurality of axial lands 24 along the side of the cover to preclude rotation of the mixing vessel.

The lower body member 19 of the base provides a housing and mounting for the motor and its controls, while the upper body member 20 in effect provides a cover for the motor housing and a support for the collar 21. The lower edge portion of the upper body member is flared outwardly and spaced from the adjacent wall of the lower body member to define a circumferential slot 26 through which cooling air can be drawn into the interior of the housing for circulation downwardly across the motor by means of a fan 27 on the motor shaft. Telescoping bosses 28 and 29 in the upper and lower body members, respectively, secure those members together. The motor frame has a mounting flange 30 having several mounting holes therein, in each of which is fitted a grommet 31 of neoprene or the like; and mounting screws 32 extend through compression washers 32' and into the bosses 28 to hold the motor and the housing members assembled with one another. The resilient grommets reduce noise and electrically insulate the motor from the housing.

The motor speed control comprises, in general, a rotatable dial 34 which provides a manual actuator, a cam 35 rotatably driven by the dial, a main toggle switch 36 and a double-throw speed range toggle switch 37 mounted adjacent to the cam, a centrifugally operated switch designated generally by 38, and a link 39 which translates rotation of the cam into adjustment of the centrifugally operated switch.

The centrifugally operated switch comprises a centrifugally responsive actuator 40 mounted on the lower end of the motor shaft for rotation therewith and spaced cooperating upper and lower resilient switch blades 41 and 42 respectivey, mounted on an adjustable arm 50 and which respectively carry switch contacts 43 and 44. The arm 50 provides for adjustment of the switch to open at different motor speeds and it is fixed with respect to the motor at one end and has the switch blades 41 and 42 projecting from its free end, across the motor shaft axis.

The switch blades 41 and 42 are secured to the arm 50 with their surfaces normal to the axis of the motor shaft and flatwise substantially parallel to one another. Rivets 52 or other securement means by which the blades are fastened to the arm may also provide terminals for the switch to which conductors (not shown) may be connected. For longer switch life, the contacts 43 and 44 are preferably mounted in laterally adjacent pairs at the free ends of the blades.

The upper switch blade 41 is biased upwardly so that its contacts tend to move away from engagement with those on the lower switch blade, but the biasing force of the upper switch blade is normally overcome by a downward force exerted upon the upper switch blade by the actuator 40, and consequently the upper arm is normally held down by the actuator, with its contacts engaged with those on the lower arm, until centrifugal force raises the actuator sufficiently to permit separation of the points.

The centrifugally responsive actuator comprises oppositely bowed upper and lower spring strips 45 and 45' respectively, fastened together at their extremities with their concave surfaces facing one another. The rivets which secure the opposite end portions of these two strips flatwise together also hold washers 46 which serve as fly-weights. The upper actuator spring strip is medially secured to the lower end of the motor shaft, as by means of a screw 47 threaded into an axial well in the shaft. A button 48 secured to and projecting downwardly from the middle of the lower actuator spring strip provides a driver which engages the upper switch arm 41. As the motor shaft revolves, centrifugal force exerted by the flyweights tends to straighten the bowed strips and thus raises the button 48, thereby permitting the upper switch blade to move upwardly and carry its switch contact out of engagement with the contact on the lower switch arm, opening the switch and thus slowing down the motor. As the motor decelerates, the centrifugal force of the flyweights of course decreases, permitting the driver to move downwardly in response to the biasing force exerted thereon by the bowed spring strips, thus forcing the upper switch blade downwardly against its own bias to close the switch contacts and re-energize the motor.

To enable adjustment of the rotational speed at which the contacts of the centrifugal switch will separate, the arm 50, which carries the switch blades, is mounted to have its free end movable up and down, to carry the switch assembly bodily toward and from the bottom of the motor shaft. For this purpose the arm comprises a relatively stiff spring strip 53, one end of which is anchored to a rigid bracket 54 on the motor frame, and having a rigid insulative strip 55 secured to its free end. The switch blades are fastened to opposite faces of the insulative portion of the arm, so as to be electrically insulated from one another, and the spring strip portion of the arm biases the arm firmly upwardly toward the actuator and also provides a resilient mounting for the switch blades whereby their contacts are isolated from vibration attendant upon the operation of the machine, so that the centrifugally operated switch will not be opened except by centrifugal forces.

The link 39, through which rotation of the cam is translated into flexing movement of the switch mounting arm for speed controlling adjustment of the centrifugal switch, comprises a bell crank which is medially pivotally mounted on the bracket 54, as by means of a pin 56, with its lower end bearing against an upwardly projecting adjusting screw 57 threaded into the medial portion of the arm 50 and its upper end engaged with the inclined rear surface of the rotatable cam 35. Thus as the cam is rotated in consequence of rotation of the dial actuator 34 from its "off" position, the bell crank is swung to carry its lower end upwardly, thereby permitting the switch mounting arm 50 to rise in response to the biasing force of the spring portion 53 thereof, to thus effect adjustment of the centrifugal switch for higher speeds. The minimum speed for which the centrifugal switch can be adjusted is of course governed by the setting of the adjusting screw 57.

Figure 6:
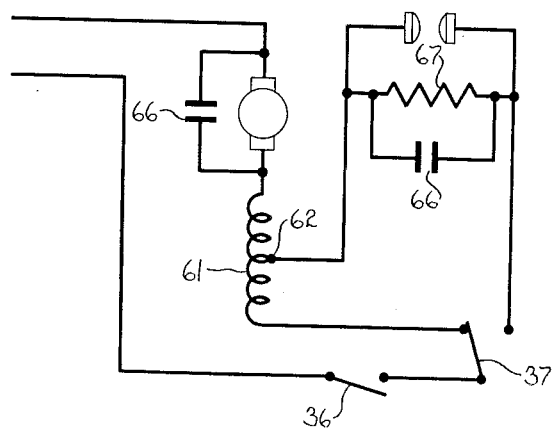
Figure 6 is a circuit diagram of the motor control of this invention.

The cam is rotatably mounted on a bracket 58 secured to the motor frame, with its shaft 59 projecting through a hole in the housing wall and mounting the dial, and the same bracket which carries the cam also has mounted thereon the toggle switches 36 and 37. The main toggle switch 36 serves to turn the machine on and off, and the doublethrow single-pole speed range toggle switch 37 provides for selection between a predetermined minimum motor speed, in which the centrifugally operated switch is not connected in the motor circuit, and a range of speeds above said minimum, in which the motor is controlled through the centrifugal switch. In its minimum speed position, as shown in Figure 6, the double-throw switch connects the entire motor winding 61 in series with the main switch for low-torque, low-speed operation of the motor. In the alternative position of the double-throw toggle switch 37 the centrifugally actuated switch is connected in series with only a portion of the motor winding through a tap 62 in the field coil, to thus provide for high-torque operation of the motor through a wide range of speeds above the minimum.

Preferably the switches 36 and 37 are actuated by means of the dial, so that the dial is the only manual control on the mixer. Such actuation is effected by means of a pair of pins 64 projecting axially from the front face of the cam and spaced from the cam axis, at diametrically opposite sides thereof. The actuating arm 65 of each toggle switch is bifurcated at its outer end, and as the cam is rotated each pin, in its proper sequence, engages in the slot between the bifurcations of its switch actuating arm to flip the switch from one position to the other. Rotation of the dial away from its "off" position first turns on the main switch and then flips the double-throw speed range switch from its minimum speed position to its governor controlled position.

Preferably condensers 66 are connected across the brushes of the motor and the contacts of the centrifugally operated switch to minimize arcing. A power resistor 67 may also be connected across the centrifugal switch contacts so that some current will flow to the motor even when the centrifugal switch is open, thus further minimizing arcing across the switch contacts and providing smoother operation of the motor.

From the foregoing description taken together with the accompanying drawings it will be readily apparent that this invention provides a speed control device for a food comminuting and blending machine or the like powered by a series-wound motor, which control is capable of providing a wide range of speeds, with high torque throughout said range of speeds, and wherein a low-torque minimum speed is also available, such speed control being effected by means of a centrifugally operated switch which regulates motor speeds in the high torque range above said minimum speed, the low-torque speed being provided by speed regulating means other than the centrifugal switch.

What I claim as my invention is:

1. Speed and torque control means for a series-wound electric motor of the type used to power food comminuting machines or the like, comprising: adjustable centrifugally responsive switch means for opening a circuit when the motor exceeds any of a range of predetermined speeds; means defining a first energizing circuit for the motor including said switch means and providing for high-torque operation of the motor; means defining a second energizing circuit for the motor including means for limiting current flow to provide for low-speed, low-torque operation of the motor; a manual control actuator mounted in a position fixed with respect to the motor and progressively movable from an "off" position through a low-torque position and a range of high-torque positions; switch means connected with said actuator for actuation thereby to energize said second energizing circuit in the low-torque position of the actuator and to energize said first circuit through the range of high-torque positions of the manual actuator; and a motion transmitting connection between said manual actuator and said centrifugally responsive switch, operative when said manual actuator is moved from one to another of the positions within its said range to effect speed controlling adjustment of said centrifugally responsive switch to thereby set the maximum speed of the motor at a value corresponding to the position of the manual actuator in said range of high-torque positions.

2. Speed and torque control means for a series-wound electric motor of the type used to power food comminuting machines or the like, characterized by: means providing a pair of energizing circuits for the motor; means in one of said energizing circuits for limiting current flow therein to provide for low-torque, low-speed operation of the motor; an adjustable centrifugally responsive switch in the other energizing circuit for controlling the speed of the motor in high-torque operation; and means for selectively energizing the motor through either of said circuits and for adjusting the centrifugally responsive switch, said means comprising a manual actuator progressively movable from a position in which neither circuit is energized to a position in which only said low-speed, low-torque circuit is energized and thence through a range of positions in which the motor is energized through said centrifugal switch; switch means actuated by said actuator to control energization of said circuits in the different positions of the actuator; and a connection between the actuator and said centrifugally actuated switch operative when the actuator is moved from one to another of the positions within its said range to effect speed controlling adjustment of the centrifugally actuated switch.

3. In a food comminuting machine or the like having a motor energizable through either of a pair of electric circuits which impart different speed and torque characteristics to the motor and one of which includes an adjustable centrifugally responsive switch, means for alternatively energizing the motor through either of said circuits and for adjusting the centrifugally responsive switch, said means comprising: a manual actuator rotatably mounted in a fixed position with respect to the motor; a pair of switches for controlling energization of said pair of circuits mounted in fixed positions with respect to and adjacent to the manual actuator and each having an actuator arm swingable from one switch position to another; abutment means connected with the manual actuator and movable by rotation of the manual actuator to engage with first one and then the other of the actuator arms of said switches as the actuator is rotated in one direction and thereby swing the actuators successively from one of their switch positions to the other; a cam constrained to rotate with the manual actuator; and means providing a cam follower engaged with said cam and connected with the centrifugal switch to effect adjustment of the latter as the cam is rotated with the manual actuator.

4. The control means of claim 1 further characterized by the fact that the series-wound motor has a field winding with a tap; further characterized by the fact that said first energizing circuit includes said tap, so that only a portion of the motor field winding is energizable through said centrifugally responsive switch; and further characterized by the fact that said second energizing circuit includes the entire field winding.

5. Means for controlling the speed of shaft rotation of a series-wound motor having a field winding, comprising: switch means including a pair of cooperating contact members, one of which is movable in opposite directions toward and from engagement with the other; means for mounting said switch means adjacent to the motor for bodily adjusting motion of said contact members in said directions; centrifugally responsive means for actuating said switch means, including an actuator on the motor shaft and a driver on said actuator movable in said directions and connected with said movable contact member for effecting movement of the same away from engagement with the other contact member when the speed of motor shaft rotation exceeds a predetermined limit; means defining a first energizing circuit for the motor including said switch means and a portion of the winding of the motor, providing for high torque operation of the motor; a manually actuatable control member mounted in a position fixed with respect to the motor and movable in opposite directions; means for translating movement of said control member in opposite directions into bodily movement of said switch means and the contact members thereon to thus enable adjustment of the speed of motor shaft rotation at which said contact members are separated and thereby provide for operation of the motor at a number of speeds when it is energized through said first energizing circuit; a second energizing circuit for the motor including the entire field winding thereof, providing for low torque operation of the motor; and a selector switch actuatable by said control member for selectively energizing the motor through either of said energizing circuits.

6. In a food comminuting machine or the like having a series-wound electric motor, means for controlling the speed of shaft rotation of the motor, comprising: an arm having one of its ends fixed with respect to the motor, at one side thereof, and extending toward the motor shaft, transversely thereto, said arm having a free end portion flexible in directions parallel to the motor shaft axis; a pair of flexible flatwise juxtaposed switch blades mounted on the free end portion of said arm in insulative relation to one another and extending endwise therefrom across the axis of the motor shaft, substantially normal thereto, and spaced from one end of the motor shaft, one of said blades being closed to the motor shaft than the other and having its free end portion movable toward and from the free end portion of the other blade in directions parallel to the motor shaft axis and biased away from said other blades; switch contacts at the free end portions of said flexible switch blades engageable in consequence of flexure of said one blade against its bias; a centrifugally responsive actuator on said end of the motor shaft including a coaxial button engaged with said one switch blade and biased away from said end of the motor shaft with a force normally sufficient to overcome the bias on said one blade and hold the switch contacts engaged, but movable against its bias in response to centrifugal force to permit said one switch blade to move away from the other and thus open the switch contacts; conductor means connecting one of said switch blades with a portion of the winding of the motor so that energization of the motor may be controlled through said switch blades; a manually actuatable control rotatably mounted in a position fixed with respect to the motor; means for translating rotation of said control in opposite directions into bodily movement of said arm in opposite directions to thus enable adjustment of the speed of motor shaft rotation at which said switch contacts are separated; a first two-position switch actuatable by said rotatable control and connectible with a source of current; and a second two-position switch actuatable by said rotatable control, connected with said first two-position switch in one position of the latter and alternatively connectible with the entire motor winding, in one of its positions, to provide low torque motor operation, and with the other of said switch blades, in the other of its positions, to provide for high torque adjustable speed operation of the motor through a range of speeds.

References Cited in the file of this patent

UNITED STATES PATENTS

| | | |
|---|---|---|
| 1,767,146 | Lee | June 24, 1930 |
| 1,857,202 | Lee | May 10, 1932 |
| 2,307,539 | Pepper | Jan. 5, 1943 |
| 2,353,314 | Lee | July 11, 1944 |
| 2,500,190 | Lee | Mar. 14, 1950 |
| 2,554,506 | Schwarz | May 29, 1951 |
| 2,598,481 | Young | May 27, 1952 |
| 2,623,961 | Holstein | Dec. 30, 1952 |